(12) United States Patent
Cho et al.

(10) Patent No.: US 8,994,675 B2
(45) Date of Patent: Mar. 31, 2015

(54) MOBILE TERMINAL AND INFORMATION PROCESSING METHOD THEREOF

(75) Inventors: Yongwon Cho, Seoul (KR); Dongsoo Shin, Suwon (KR); Manho Lee, Seoul (KR); Younghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 13/500,766

(22) PCT Filed: Sep. 30, 2010

(86) PCT No.: PCT/KR2010/006672
§ 371 (c)(1),
(2), (4) Date: Apr. 6, 2012

(87) PCT Pub. No.: WO2011/043555
PCT Pub. Date: Apr. 14, 2011

(65) Prior Publication Data
US 2012/0326996 A1 Dec. 27, 2012

(30) Foreign Application Priority Data
Oct. 6, 2009 (KR) .......................... 10-2009-0094611

(51) Int. Cl.
G06F 3/041 (2006.01)
G06F 3/0488 (2013.01)
G06F 3/023 (2006.01)
H04M 1/23 (2006.01)

(52) U.S. Cl.
CPC .......... *G06F 3/04886* (2013.01); *G06F 3/0237* (2013.01); *H04M 1/23* (2013.01); *H04M 2250/22* (2013.01)
USPC ........... 345/173; 345/168; 345/358; 707/541; 707/539

(58) Field of Classification Search
CPC ... G06F 3/0488; G06F 3/04883; G06F 3/044; G06F 3/04886; G06F 3/045
USPC ........... 345/168, 173, 358, 348; 707/541, 539
See application file for complete search history.

(56) References Cited

U.S. PATENT DOCUMENTS

| | | | | |
|---|---|---|---|---|
| 5,917,493 A | * | 6/1999 | Tan et al. | 715/835 |
| 2002/0021287 A1 | * | 2/2002 | Tomasi et al. | 345/168 |
| 2004/0008129 A1 | | 1/2004 | Philipp | |
| 2007/0273561 A1 | * | 11/2007 | Philipp | 341/33 |
| 2009/0135147 A1 | * | 5/2009 | Hsu et al. | 345/173 |

FOREIGN PATENT DOCUMENTS

| | | |
|---|---|---|
| KR | 10-2007-0114035 A | 11/2007 |
| KR | 10-2008-0029028 A | 4/2008 |
| KR | 10-2008-0081330 A | 9/2008 |

\* cited by examiner

*Primary Examiner* — Shaheda Abdin
(74) *Attorney, Agent, or Firm* — Birch, Stewart, Kolasch & Birch, LLP

(57) ABSTRACT

A mobile terminal and an information processing method for displaying a plurality of virtual key buttons on a touchscreen including one or more touch input nodes generating a touch signal corresponding to touch; receiving a touch signal corresponding to virtual key buttons displayed on the touchscreen; and outputting a key value of at least one of the plurality of virtual key buttons as a key value corresponding to the received touch signal according to touch data calculated based on the received touch signal, wherein the touch data is calculated by expanding the touch signal to a virtual touch input node in proximity to touch input nodes generating the touch signal from among the one or more one touch input nodes.

17 Claims, 15 Drawing Sheets

FIG. 5
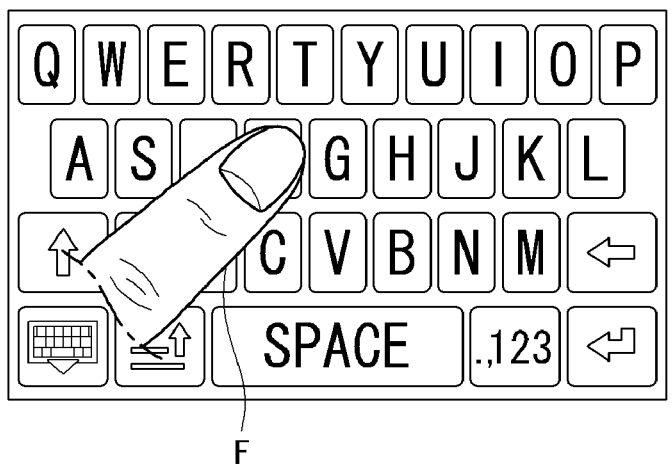
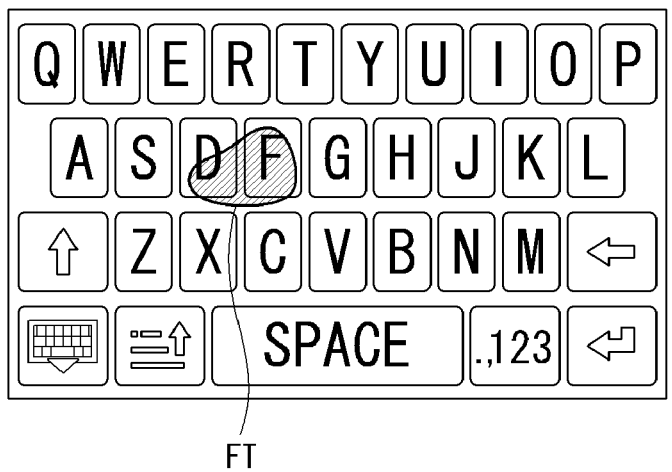

FIG. 11

| | PRIORITY CONDITION | |
|---|---|---|
| 1 | VERTICAL DIRECTION | UPPER KEY BUTTON |
| 2 | HORIZONTAL DIRECTION | CENTER KEY BUTTON |

FIG. 12

| | PRIORITY | WEIGHT |
|---|---|---|
| 1 | FIRST LINE | 8 |
| 2 | SECOND LINE | 4 |
| 3 | THIRD LINE | 2 |
| 4 | FOURTH LINE | 1 |

…

MOBILE TERMINAL AND INFORMATION PROCESSING METHOD THEREOF

BACKGROUND

1. Field

Embodiments of the present invention may relate to a mobile terminal and an information processing method thereof and, more particularly, to a mobile terminal and an information processing method thereof for increasing a touch input recognition rate by outputting a key value that a user really intends to input.

2. Background

Terminals can be classified as a mobile terminal and a stationary terminal according to mobility. The mobile terminal is classified into a handheld terminal and a vehicle mount terminal according to user portability.

The improvement of a structural part and/or software part of a terminal can be considered in order to support and enhance functions of the terminal.

Recently, a variety of terminals including mobile terminals have provided complicated and various functions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5 to 9 illustrate touch input applied to virtual key buttons shown in FIG. 4 according to an embodiment of the present invention;

FIGS. 11 and 12 show priority condition with respect to the touch input of FIG. 10;

DETAILED DESCRIPTION

Figure 1:
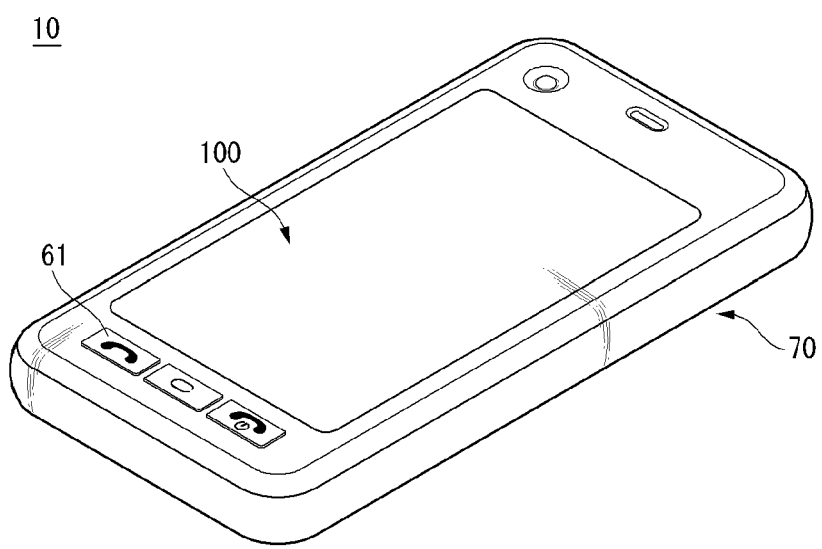
FIG. 1 is a perspective view of a mobile terminal according to an embodiment of the present invention.

An object of the present invention is to provide a mobile terminal and an information processing method thereof for increasing a touch input recognition rate by outputting a key value that a user really intends to input.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

According to one aspect of the present invention, an information processing method of a mobile terminal, includes: displaying a plurality of virtual key buttons on a touchscreen including one or more touch input nodes generating a touch signal corresponding to touch; receiving a touch signal corresponding to virtual key buttons displayed on the touchscreen; and outputting a key value of at least one of the plurality of virtual key buttons as a key value corresponding to the received touch signal according to touch data calculated based on the received touch signal, wherein the touch data is calculated by expanding the touch signal to a virtual touch input node in proximity to touch input nodes generating the touch signal from among the one or more one touch input nodes.

The virtual touch input node may correspond to at least one virtual point located between the touch input nodes generating the touch signal and a touch input node in proximity to the touch input nodes generating the touch signal.

The touch data may include an attenuation value of the touch based on the distance between the touch input nodes and the virtual touch input node.

The outputting of the key value of at least one of the plurality of virtual key buttons as a key value corresponding to the received touch signal may include outputting a key value of a virtual key button at least part of which overlaps with the shape of a touch region formed according to the touch data, as the key value corresponding to the touch, wherein the output key value is determined on the basis of a predetermined priority.

The shape of the touch region may correspond to a closed surface including at least one of the touch input nodes generating the touch signal.

The priority may be applied such that a virtual key button having a larger area overlapping with the shape of the touch region from among the plurality of virtual key buttons is given a higher priority.

The priority may be applied such that a virtual key button located at the upper part from among the plurality of virtual key buttons is given a higher priority.

The priority may be applied such that a center virtual key button from among the plurality of virtual key buttons is given a higher priority.

The priority may be applied such that a virtual key button outputting a key value, which is input following a previously input key value to accomplish a meaningful word or sentence, is given a higher priority.

The information processing method may further include setting the priority.

The displaying of the plurality of virtual key buttons may include displaying the plurality of virtual key buttons such that at least one of the area, height and width of at least one of the plurality of virtual key buttons is different from at least one of the area, height and width of another virtual key button.

According to another aspect of the present invention, an information processing method of a mobile terminal, including: displaying a plurality of virtual key buttons on a touchscreen including one or more touch input nodes generating a touch signal corresponding to touch; receiving a touch signal corresponding to virtual key buttons displayed on the touchscreen; and outputting a key value of a virtual key button at least part of which overlaps with the shape of a touch region formed according to touch data calculated on the basis of the received touch signal, as a key value corresponding to the touch, wherein the output key value is determined on the basis of a predetermined priority, wherein the touch data is calculated by expanding the touch signal to a virtual touch input node in proximity to touch input nodes generating the touch signal from among the one or more touch input nodes.

The virtual touch input node may correspond to at least one virtual point located between the touch input nodes generating the touch signal and a touch input node in proximity to the touch input nodes generating the touch signal.

The touch data may include an attenuation value of the touch based on the distance between the touch input nodes and the virtual touch input node.

The priority may be determined such that a virtual key button having a larger area overlapping with the shape of the touch region from among the plurality of virtual key buttons is given a first higher priority, a virtual key button located at the upper part from among the plurality of virtual key buttons is given a second higher priority, a center virtual key button from among the plurality of virtual key buttons is given a third higher priority, a virtual key button outputting a key value, which is input following a previously input key value to accomplish a meaningful word or sentence, is given a fourth higher priority, or a fifth priority corresponding to a combination of at least two of the first to fourth higher priorities is used.

The displaying of the plurality of virtual key buttons may include displaying the plurality of virtual key buttons such that at least one of the area, height and width of at least one of the plurality of virtual key buttons is different from at least one of the area, height and width of another virtual key button.

According to another aspect of the present invention, a mobile terminal includes a touchscreen configured to include one or more touch input nodes generating a touch signal corresponding to touch; and a controller configured to receive a touch signal corresponding to one or more virtual key buttons from among a plurality of virtual key buttons displayed on the touchscreen and to output a key value of at least one of the plurality of virtual key buttons as a key value corresponding to the received touch signal according to touch data calculated on the basis of the received touch signal, wherein the controller calculates the touch data by expanding the touch signal to a virtual touch input node in proximity to touch input nodes generating the touch signal from among the one or more one touch input nodes.

The controller may set at least one virtual point located between the touch input nodes generating the touch signal and a touch input node in proximity to the touch input nodes generating the touch signal as the virtual touch input node.

The touch data may include an attenuation value of the touch based on the distance between the touch input nodes and the virtual touch input node.

The controller may be configured to output a key value of a virtual key button at least part of which overlaps with the shape of a touch region formed according to the touch data, as a key value corresponding to the touch, wherein the output key value is determined on the basis of a predetermined priority.

The priority may be applied such that a virtual key button having a larger area overlapping with the shape of the touch region from among the plurality of virtual key buttons is given a higher priority.

The priority may be applied such that a virtual key button located at the upper part from among the plurality of virtual key buttons is given a higher priority.

The priority may be applied such that a center virtual key button from among the plurality of virtual key buttons is given a higher priority.

The priority may be applied such that a virtual key button outputting a key value, which is input following a previously input key value to accomplish a meaningful word or sentence, is given a higher priority.

The controller may be configured to display the plurality of virtual key buttons such that at least one of the area, height and width of at least one of the plurality of virtual key buttons is different from at least one of the area, height and width of another virtual key button.

Advantageous Effects

The mobile terminal and information processing method thereof according to the present invention can increase a touch input recognition rate by outputting a key value that a user really intends to input.

BEST MODE FOR CARRYING OUT THE INVENTION

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

A description will be made of a mobile terminal according to the present invention with reference to the attached drawings. Suffixes "module" and "part" for components in the following description are given or used in consideration of only facilitation of explanation and do not have discriminated meanings or functions.

A mobile terminal described in the present invention may include a cellar phone, a smart phone, a laptop computer, a digital broadcasting terminal, PDA (Personal Digital Assistants), PMP (Portable Multimedia Player), a navigation system, etc.

FIG. 1 is a perspective view of a mobile terminal 10 according to an embodiment of the present invention.

As shown in FIG. 1, the mobile terminal 10 according to an embodiment of the present invention may include a body 70, input keys 61, and a touchscreen 100.

The body 70 forms the external appearance of the mobile terminal 10. The body 70 may be configured by combining a front body and a rear body. The body 70 protects internal components of the mobile terminal 10, such as a controller 40 shown in FIG. 2, from external impact. Furthermore, surface treatment and decoration may be applied to the body 70 through post-processing in order to secure emotional quality. While the body 70 shown in FIG. 1 has a bar shape, it can be configured in various forms such as slide, folder, swing and swivel forms.

The input keys 61 may be physical buttons corresponding to call, cancel and end buttons. If required, the input keys 61 are not provided to the body 70 and can be replaced by virtual key buttons (VK of FIG. 3) displayed on the touchscreen 100. The virtual key buttons (VK of FIG. 3) will be described in detail below.

Figure 2:
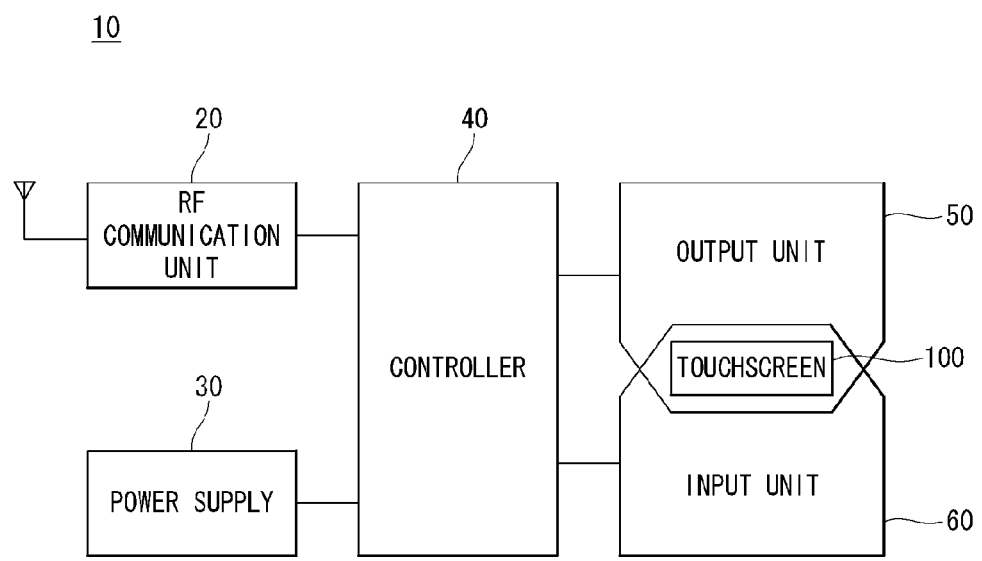
FIG. 2 is a block diagram illustrating a configuration of the mobile terminal shown in FIG. 1.

FIG. 2 is a block diagram illustrating a configuration of the mobile terminal shown in FIG. 1.

Referring to FIG. 2, the mobile terminal 10 according to an embodiment of the present invention may include an RF communication unit 20, an input unit 60, an output unit 50, a controller 40, a power supply 30, and the touchscreen 100.

The RF communication unit 20 may include one or more modules which enable wireless communication between the mobile terminal 100 and a wireless communication system, or between the mobile terminal 10 and a network in which the mobile terminal 10 is located. For example, the RF communication unit 20 may include a broadcast reception module, a mobile communication module, a wireless Internet module, a near field communication module, and a location information module.

The input unit 60 generates input data used for a user to control an operation of the mobile terminal 10. The input unit 60 may be configured in the form of a key pad, a dome switch, a jog wheel, a jog switch, etc. as well as a constant-pressure type or capacitive touchpad as shown in FIG. 1.

The output unit 50 is a device for generating a visual, aural or tactile output. The output unit 50 may include an audio output module, an alarm unit and a haptic module, etc. in addition to the touchscreen 100 shown in the figure.

The controller 40 controls the overall operation of the mobile terminal 10. For example, the controller 40 can perform control and processing related with voice communication, data communication, video communication, etc. The controller 40 can perform pattern recognition processing for recognizing handwriting input or drawing input applied to the touchscreen as a character or an image.

The power supply 30 is provided with external power and internal power and supplies power required for operations of the components of the mobile terminal 10 under the control of the controller 40.

The touchscreen 100 may be provided to the mobile terminal 10 such that it occupies the majority of the front part of the body (70 of FIG. 1). The touchscreen 100 can display information and allow the user to select specific information displayed thereon. The touchscreen 100 may be configured in the form of a combination of a display panel and a touch panel. That is, the touchscreen 100 can be configured in such a manner that a touch panel capable of receiving touch input is combined with a display panel such as an LCD, an OLED or the like. Furthermore, the touchscreen 100 can be configured in the form of integration of the display panel and the touch panel. The touch panel may be of resistance type, capacitive type, infrared type, ultrasonic type, etc. A capacitive touch panel recognizes touch input by sensing a capacitance variation between conductive layers included therein. The capacitive touch panel may include two conductive layers, a single insulating substrate, and a protective film and further have an additional shield layer for increasing a signal-to-noise ratio, which is not shown in the figure.

The touchscreen 100 may function as the output unit 50 and the input unit 60 since it includes the display panel displaying images and the touch panel receiving touch input. That is, the touchscreen 100 serves as the output unit 50 by displaying the virtual key buttons (VK of FIG. 3) thereon and functions as the input unit 60 by receiving touch input applied to the displayed virtual key buttons (VK of FIG. 3).

Figure 3:
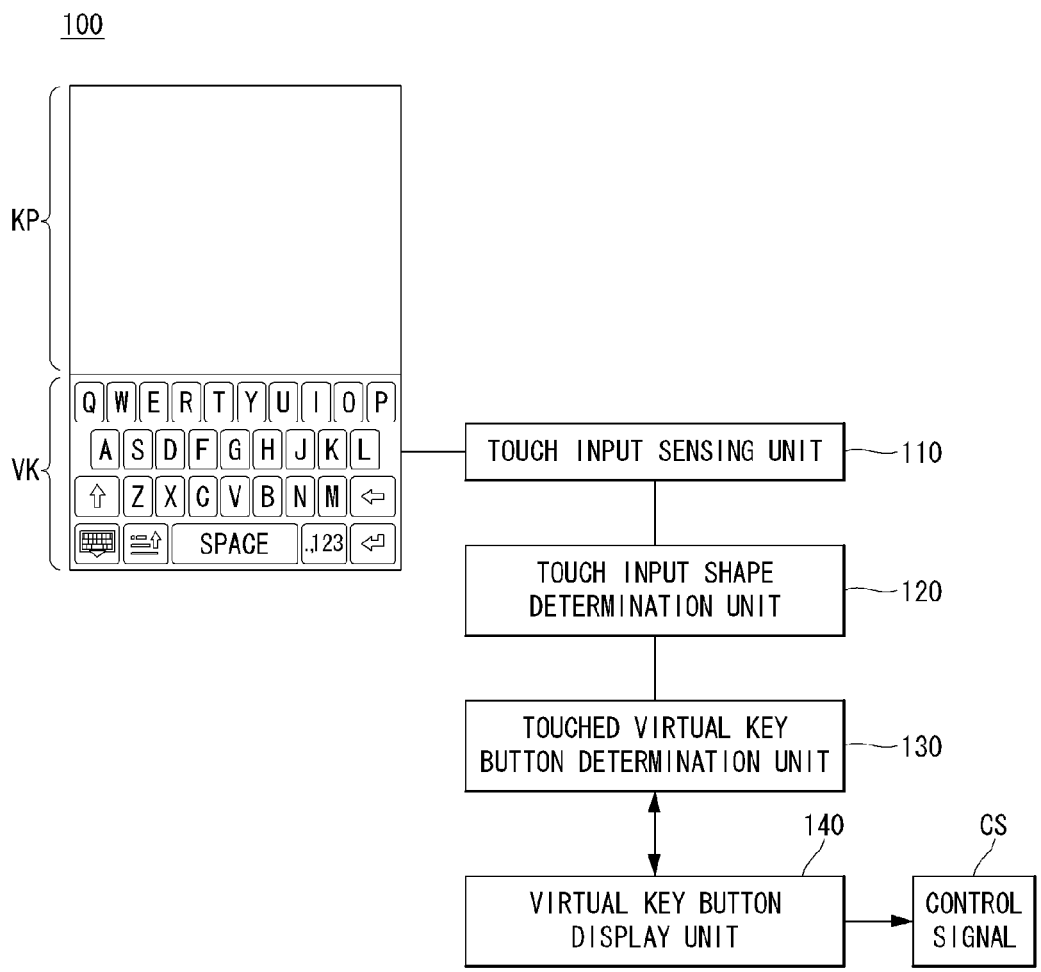
FIG. 3 illustrates an operation with respect to touch input of the mobile terminal shown in FIG. 2.

FIG. 3 illustrates an operation with respect to touch input of the touchscreen shown in FIG. 2.

As shown in FIG. 3, the touchscreen 100 according to an embodiment of the present invention can be divided into two areas. Specifically, a key value display part KP for displaying an input key value may be displayed on the upper part of the touchscreen 100 and the virtual keypad VK for receiving key input by touch may be displayed on the lower part of the touchscreen 100.

The virtual keypad VK can be displayed in the form of QWERTY keyboard. However, the virtual keypad VK is not limited to the QWERTY keyboard and can be modified in various manners. Furthermore, the virtual keypad VK is not limited to the display for inducing input of characters. That is, the virtual keypad VK may be displayed as various icons or characters to which touch input is applied during games. For example, if a baduk game is displayed on the touchscreen 100, the virtual keypad VK can be displayed as baduk pieces on a go board. While the virtual keypad VK can be implemented in various manners as described above, embodiments of the present invention will be described on the assumption that the virtual keypad VK is a QWERTY keyboard. When touch input is applied to the virtual keypad VK, a touch input sensing unit 110 senses the touch input.

Figure 6:
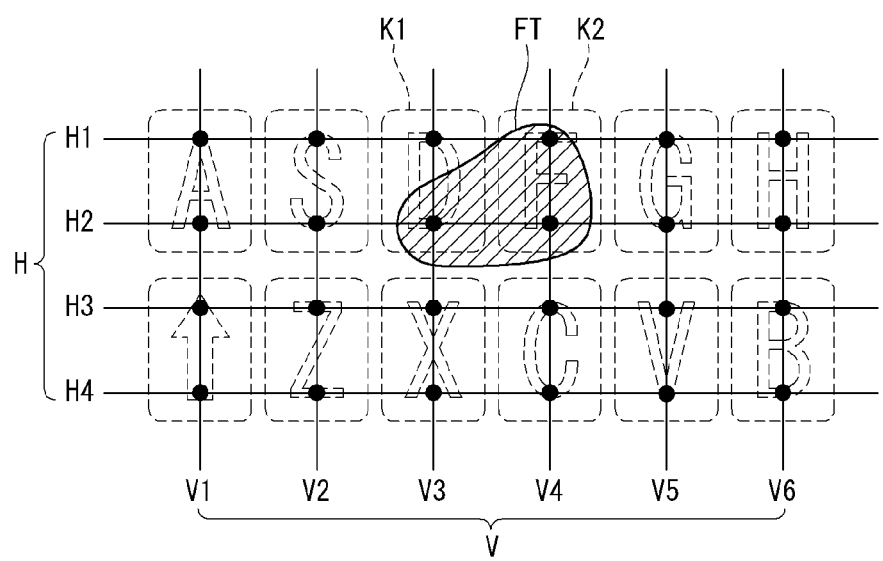

The touch input sensing unit 110 can sense signals generated from touch sensing nodes (the points of intersections of H and K in FIG. 6). Specifically, when the user touches the virtual keypad VK, a signal is generated from touch sensing nodes in proximity to the touched point and the touch input sensing unit 110 senses the point of the touchscreen 100, which is touched by the user, and touching force at each of the touch sensing nodes (the points of intersections of H and K in FIG. 6) on the basis of the signal.

A touch input shape determination unit 120 can determine the shape of a region to which touch input is applied on the basis of a touch signal sensed by the touch input sensing unit 110. The touchscreen 100 is touched by a finger, in general. Accordingly, when the user touches the touch screen 100, the user touches a plane rather than a point. In this case, the touch input shape determination unit 120 determines the shape of a touched plane. The operation of the touch input shape determination unit 120 which determines the shape of a touched plane will be described in detail below.

A touched virtual key button determination unit 130 determines a key button, which is estimated to be a key button that the user really intends to touch, on the basis of the shape of the touched plane, obtained by the touch input shape determination unit 120. The key button, which is estimated to be a key button that a user really intends to touch, can be determined on the basis of the shape of the touched region according to a touch habit of the user and a priority. Upon determination of the key button, the touched virtual key button determination unit 130 can output the key value corresponding to the key button as a control signal CS. The operation of the touched virtual key button determination unit 130 will be described in detail below.

A virtual key button display unit 140 displays the virtual keypad VK on the touchscreen 100. The virtual key button display unit 140 can transmit information about the displayed virtual keypad VK to the touched virtual key button determination unit 130. The information about the displayed virtual keypad VK may include information on the position of each key button. The touched virtual key button determination unit 130 can refer to the information about the virtual keypad VK, received from the virtual key button display unit 140, to determine the key button estimated to be a key button that the user really intends to touch.

Figure 4:
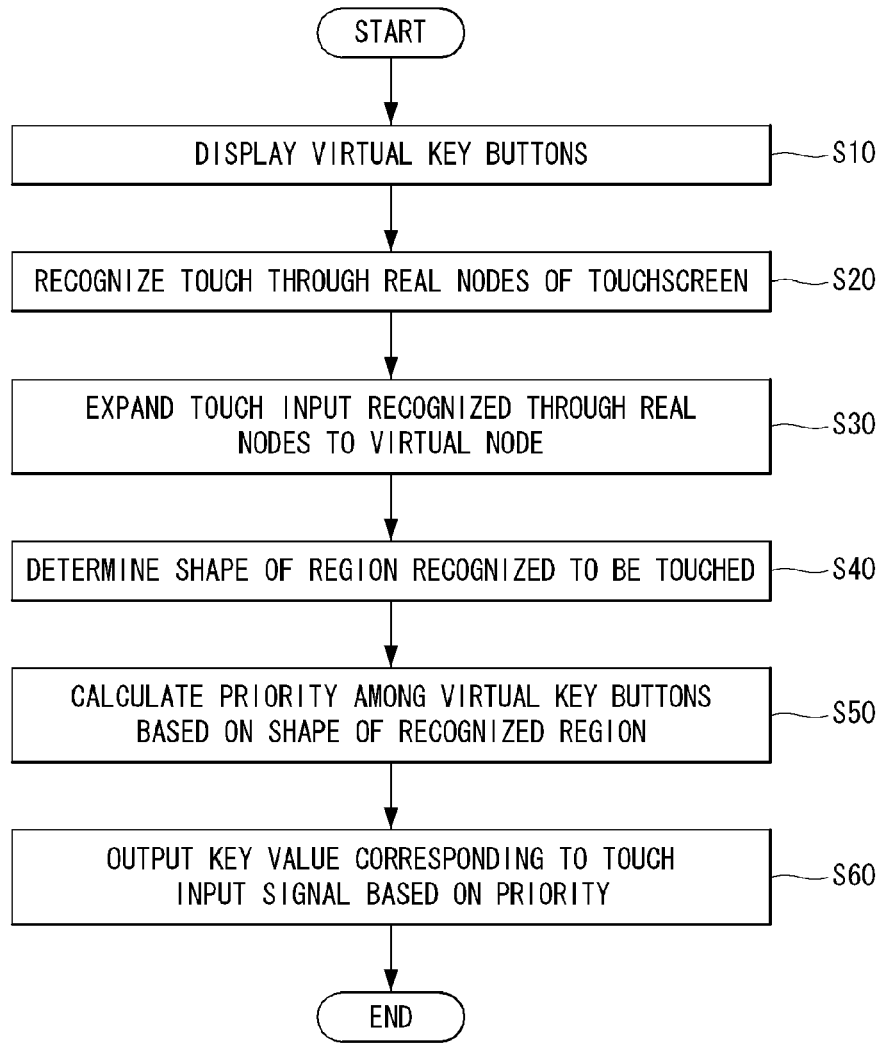
FIG. 4 is a flowchart illustrating an operation of the mobile terminal shown in FIG. 1.

FIG. 4 is a flowchart illustrating an operation of the mobile terminal shown in FIG. 1.

Referring to FIG. 4, the mobile terminal 10 according to an embodiment of the present invention may include step S10 of displaying virtual key buttons VK.

When the virtual key buttons VK are displayed, touch can be recognized through real nodes of the touchscreen 100 (S20).

The touchscreen 100 can sense touch through touch sensing nodes (the points of intersections of H and K in FIG. 6). The real nodes mean the touch sensing nodes. The real nodes physically exist and generate an electric signal corresponding to touch which is actually applied to the virtual key buttons. The electric signal generated from the real nodes can be transmitted to the touch input sensing unit (110 of FIG. 3) and recognized as a specific coordinate on the touch screen 100.

Upon recognition of the touch through the real nodes of the touchscreen 100, the touch input recognized through the real nodes is expanded to virtual nodes (S30), and the shape of a region recognized to be touched is determined (S40).

The specific coordinate generated from the real nodes and transmitted to the touch input sensing unit (110 of FIG. 3) can be converted into a two-dimensional 2D touch shape by the touch input shape determination unit (120 of FIG. 3). The 2D touch shape can be formed using virtual nodes between real nodes. Specifically, it is possible to set a plurality of virtual nodes among real nodes and calculate correlation of each real node and each virtual node in consideration of the fact that the intensity of a touch input signal of each real node depending on touching force, touch duration, etc. is attenuated according to distance. That is, when touch input '10' is applied to a specific real node, it can be assumed that touch input '9' is applied to a virtual node closest to the specific real node and touch input '8' is applied to a virtual node less close to the specific node. Considering a touch input distribution using virtual nodes more densely distributed than the real nodes, touch input can be represented as a 2D area having a specific shape. Since a 2D area reflects a portion of the touchscreen 100, which is touched by a user's finger for a predetermined time, the 2D area has a circular, oval or non-rectangular closed surface.

Upon determination of the shape of the region recognized to be touched, a priority among the virtual key buttons is calculated on the basis of the determined shape (S50) and a key value corresponding to the touch input signal based on the priority is output (S60).

As described above, the shape of the recognized region forms a circular, oval or non-rectangular closed surface based on the shape of a fingertip. The recognized region can overlap with a plurality of virtual key buttons. However, in this case, the areas of the virtual key buttons, which overlap with the recognized region, may be different. At this time, a key button having a wider area overlapping with the recognized region can be regarded as a key button which is determined to be touched by the user. A priority can be used as the standard of judgment of the key button determined to be touched by the user. It is possible to output a key value corresponding to the key button, determined to be a key button that the user really intends to input, from among virtual key buttons overlapping with the recognized region on the basis of various standards. This will be described in detail below.

FIGS. 5 to 9 illustrate touch input applied to the virtual key buttons shown in FIG. 4 according to an embodiment of the present invention.

As shown in FIG. 5(a), a user can touch a virtual key button VK using a fingertip F. At this time, two or more virtual key buttons VK may be touched when the area of the fingertip F is wider than the displayed virtual key button VK or the fingertip F touches the virtual key button obliquely.

FIG. 5(b) illustrates that the user's touch is applied to a plurality of virtual key buttons VK due to the above-mentioned cause. The closed surface FT corresponding to the shape of the touched area may overlap with buttons 'D' and 'F'. When touch input is applied to a plurality of virtual key buttons VK, a conventional technique, which recognizes touch input as a coordinate value, recognizes that button 'D' initially touched by the fingertip F is input, buttons 'D' and 'F' are subsequently input with a time difference therebetween, or button 'F' touched later is input, and thus the conventional technique can output a different key value depending on the situation. Distinguished from this conventional technique, the mobile terminal 10 according to an embodiment of the present invention can estimate the real intention of the user on the basis of priority even when a plurality of virtual key buttons are touched so as to output a consistent key value. This can improve a touch input recognition rate.

Referring to FIG. 6, the touch closed surface FT according to the user's touch input can be formed in a region including specific real nodes (intersections of H and V). The real nodes (intersections of H and V) can be formed according to intersections of a horizontal pattern H and a vertical pattern V formed on the touchscreen 100. The user's touch as shown in FIG. 5 can be applied to button 'D' K1 and button 'F' K2, and an electric signal according to the touch can be generated from real nodes at intersections of H1 and V4, H2 and V3, and H2 and V4.

Figure 7:
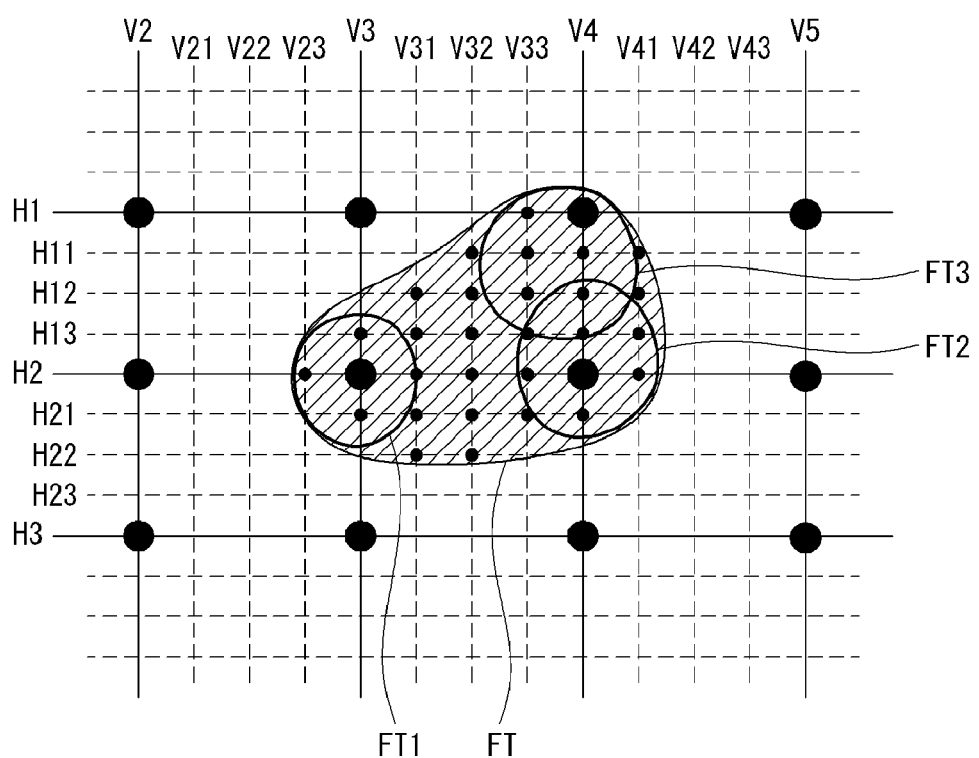

Referring to FIG. 7, it can be assumed that virtual nodes (intersections of V21 to V43 and H11 to H23) exist between the real nodes (intersections of H1 and V4, H2 and V3, and H2 and V4). The virtual nodes (intersections of V21 to V43 and H11 to H23) can be arranged in a space between the real nodes (intersections of H1 and V4, H2 and V3, and H2 and V4) and determine the shape of the touched region. For example, at the first real node (intersection of V3 and H2), the touching force corresponding to the touch input can be considered to affect a first touch closed curve FT1 depending on the user's pressing force and touch duration. That is, the touch input can be calculated on the assumption that the touch input reaches the first touch closed curve FT1 including the first, second, third and fourth virtual nodes (intersection of V3 and H13, intersection of V23 and H2, intersection of V3 and H21, and intersection of V31 and H2) when considering the touching force applied to the first real node (intersection of V3 and H2). In this manner, the touch input can be calculated on the assumption that the touch input applied to the second and third real nodes (intersection of V4 and H1 and intersection of V4 and H2) reaches the second and third touch closed curves FT2 and FT3.

The distribution of touching force in the space among the first, second and third touch closed surfaces FT1, FT2 and FT3 can be determined on the basis of relative positions of the first, second and third real nodes (intersection of V3 and H2, intersection of V4 and H1 and intersection of V4 and H2) and a touching force moving path.

The touching force corresponding to the overlapping region of the second and third touch closed surfaces FT2 and FT3 can be considered to be strong because the touch input applied to the second real node (intersection of V3 and H2) overlaps with the touch input applied to the third real node (intersection of V4 and H2) in the overlapping region.

Consequently, the touch closed surface FT can be calculated using the first, second and third real nodes (intersection of V3 and H2, intersection of V4 and H1 and intersection of V4 and H2) and the virtual nodes (the points of intersections of V21 to V43 and H11 to H23) among the first, second and third real nodes.

Figure 8:
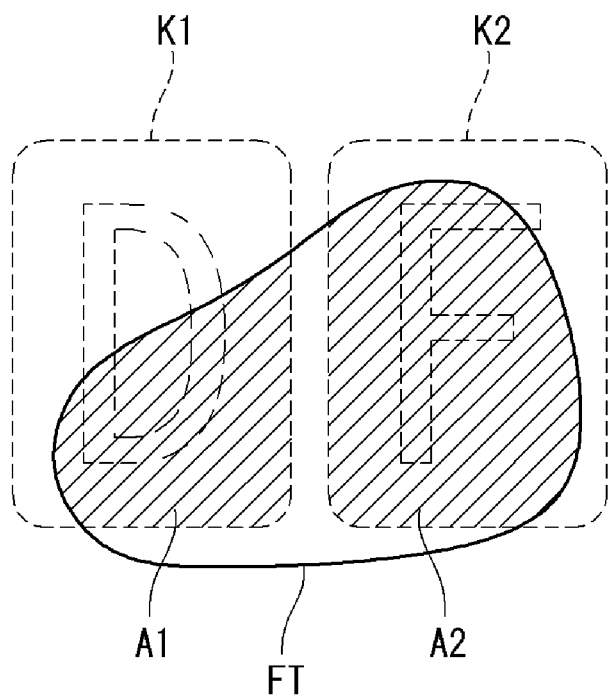

Referring to FIG. 8, the calculated touch closed surface FT can overlap with button 'D' K1 and button 'F' K2. It is possible to determine which key button is touched and whether to output a key value corresponding to the touched key button on the basis of a predetermined priority through the touch closed surface FT overlapping with button 'D' K1 and button 'F' K2. The priority can be newly set or adjusted by the user of the mobile terminal 10 to be adapted to touch habit, which may be specific to each user.

In the mobile terminal 10 according to an embodiment of the present invention, a touched area can be considered to be the priority. Referring to FIG. 8, button 'D' K1 and the touch closed surface FT overlap with each other by a first area A1 and button 'F' K2 and the touch closed surface FT overlap with each other by a second area A2. Since the second area A2 is wider than the first area A1, the touched virtual key button determination unit (130 of FIG. 3) can determine that button 'F' K2 is touched and output a key value corresponding to button 'F' K2. It is reasonable to assume that the user presses a finger against a desired touch point, and thus a larger touch area can be formed at a point that the user really intends to touch. Therefore, a key button touched in a wider area can be considered to be a key button that the user really wants to touch.

Figure 9:
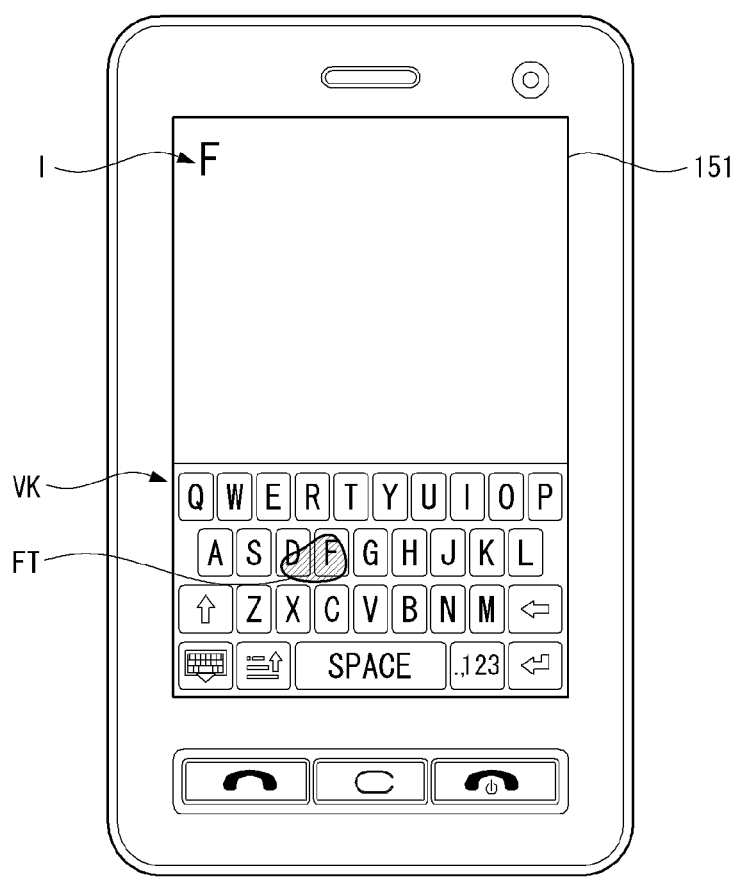

FIG. 9 illustrates that the touch closed surface FT is formed according to touch applied to virtual key buttons VK and F is input as a key value I on the basis of the priority according to the shape of the touch closed surface FT.

Figure 10:
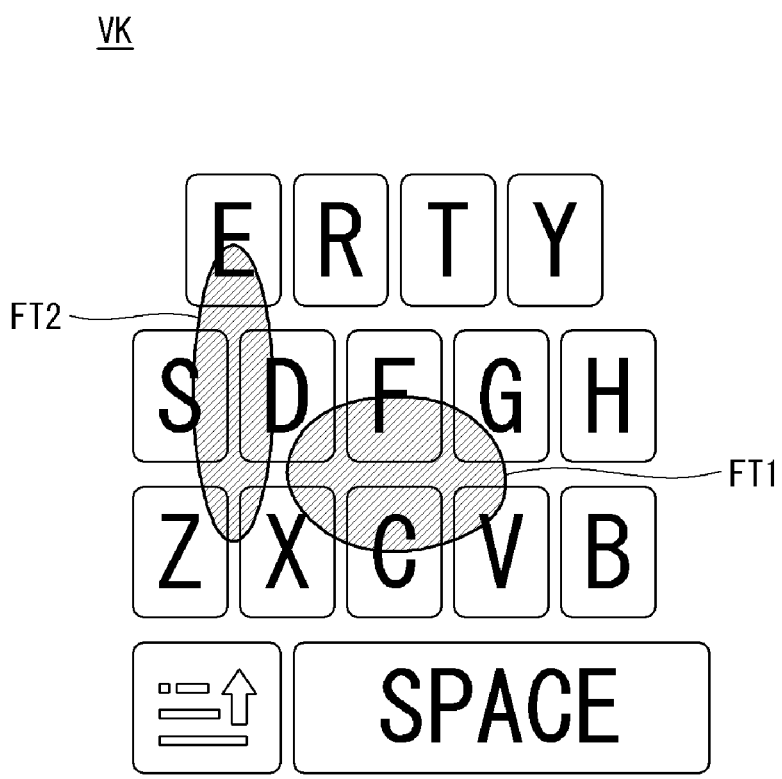
FIG. 10 illustrates touch input applied to the virtual key buttons shown in FIG. 4 according to another embodiment of the present invention.

FIG. 10 illustrates touch input applied to the virtual key buttons shown in FIG. 4 according to another embodiment of the present invention, and FIGS. 11 and 12 show a priority condition with respect to the touch input of FIG. 10.

Referring to FIG. 10, touch inputs applied to the virtual key buttons VK can be made in various forms. FIG. 10 illustrates first and second touch closed surfaces FT1 and FT2 which are converted from touch inputs using virtual nodes. The first touch closed surface FT1 corresponds to an oval in the horizontal direction and the second touch closed surface FT2 corresponds to an oval in the vertical direction. As shown in FIG. 10, the first touch closed surface FT1 overlaps with 6 key buttons whereas the second touch closed surface FT2 overlaps with 5 key buttons. When a touch closed surface overlaps with a plurality of key buttons, the key button that the user really intends to input can be determined according to a priority as described above.

FIG. 11 shows an exemplary priority condition. Referring to FIG. 11, in the case of key buttons located in the vertical direction, the upper key button can be considered to have a higher priority. In the case of key buttons arranged in the horizontal direction, the center key button can be considered to have a higher priority. When this priority is applied to the first touch closed surface FT1 of FIG. 10, buttons 'D', 'F' and 'G' have higher priorities than buttons 'X', 'C' and 'V' and, among buttons 'D', 'F' and 'G', button 'F' corresponding to the center key button has a higher priority. Consequently, button 'F' has the highest priority. Accordingly, the key button determination unit (130 of FIG. 3) can determine that the user touches button 'F' and output a key value corresponding to button 'F'.

FIG. 12 shows another example of priority condition. Referring to FIG. 12, a first line has a highest priority weight and a fourth line has a lowest priority weight. When this priority condition is applied to the second touch closed surface FT2 of FIG. 10, button 'E' is located on the first line having the highest priority weight, and thus the key button determination unit (130 of FIG. 3) can determine that the user touches button 'E' and output a key value corresponding thereto. Alternatively, it is possible to multiply a determined priority weight by the areas of the key buttons overlapping with the second touch closed surface FT2 and determine that a key button corresponding to the largest value from among the multiplication results is touched by the user.

Figure 13:
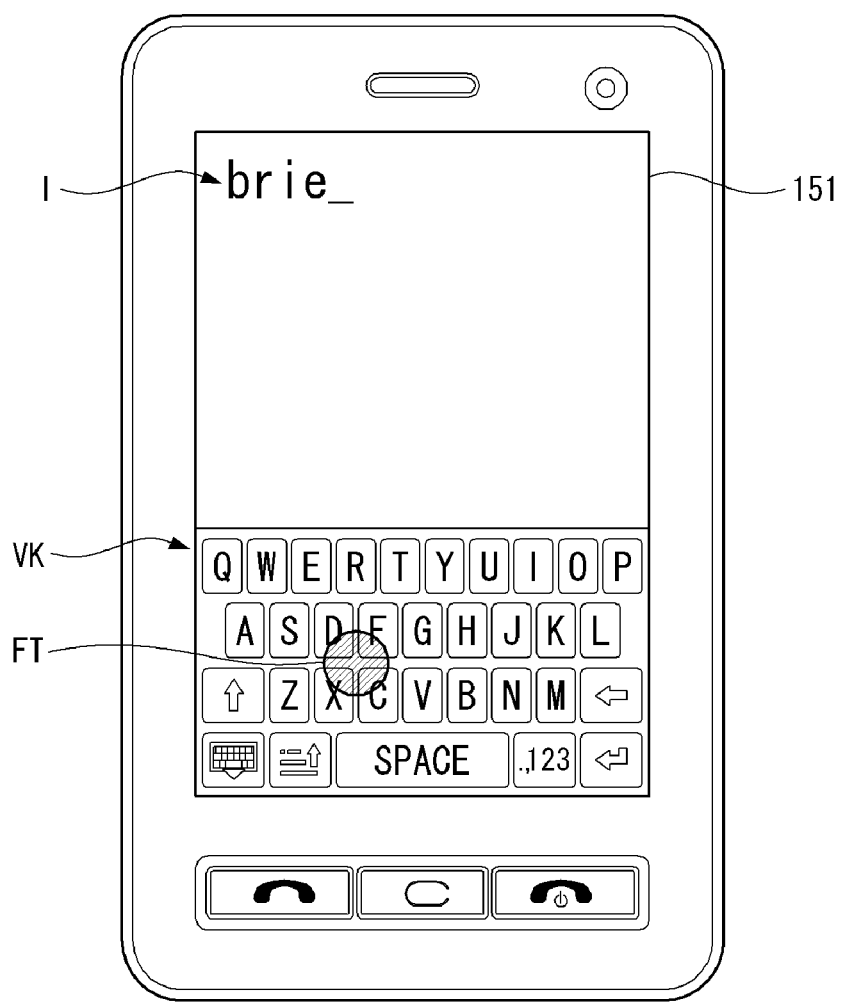
FIGS. 13 and 14 illustrate touch input applied to the virtual key buttons shown in FIG. 4 according to another embodiment of the present invention.
Figure 14:
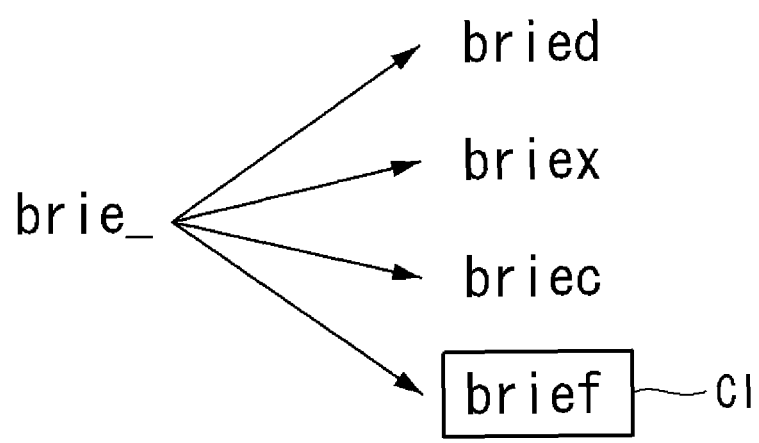

FIGS. 13 and 14 illustrate touch input applied to the virtual key buttons shown in FIG. 4 according to another embodiment of the present invention.

Referring to FIG. 13, letters I can be input using the virtual key buttons VK of the mobile terminal 10. FIG. 13 shows a state that letters "brie" have been input and the user applies touch input to the virtual key buttons VK of a touchscreen 151 in order to input the following letter. The touch closed surface FT caused by the touch input by the user overlaps with buttons 'D', 'F', 'X' and 'C'.

Referring to FIG. 14, the controller (40 of FIG. 2) can estimate a key value to be input following the input letters on the basis of the letters I input so far when the touch closed surface FT overlaps with a plurality of key buttons. That is, the controller (40 of FIG. 2) can determine a key button which can accomplish a meaningful word from among the key buttons overlapping with the touch closed surface FT as a key button that the user really intends to input. According to this operation of the controller (40 of FIG. 2), a final input value CI "brief" can be displayed on the touchscreen 151. When a plurality of meaningful words is estimated, all the words are displayed on the touchscreen 151 such that the user can select one of them.

Figure 15:
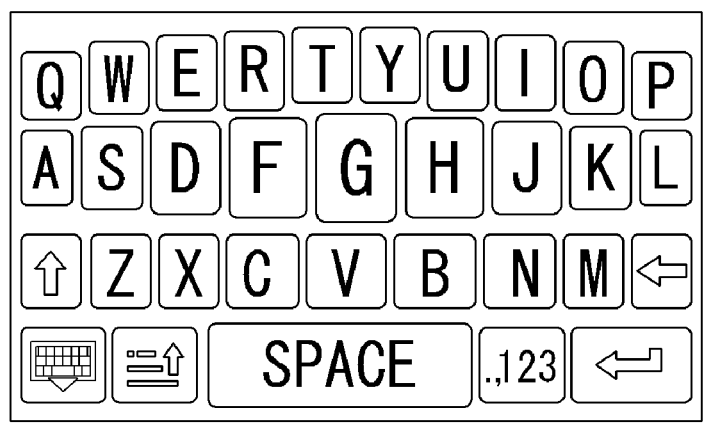
FIG. 15 illustrates virtual key button arrangement of a mobile terminal according to another embodiment of the present invention.

FIG. 15 illustrates virtual key button arrangement of a mobile terminal according to another embodiment of the present invention.

Referring to FIG. 15, the virtual key buttons can be displayed in different sizes. Specifically, virtual key buttons located at the center, which are relatively frequently used, are displayed in a larger size and virtual key buttons which are not frequently used are displayed in a smaller size. In this case, the possibility that the user performs wrong touch input can be decreased. Furthermore, the recognition rate of touch input using a touch closed surface can be improved by displaying the virtual key buttons in different sizes.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. In addition, it will be obvious to those skilled in the art that claims that do not explicitly cite in each other in the appended claims may be presented in combination as an exemplary embodiment of the present invention or included as a new claim by subsequent amendment after the application is filed.

What is claimed is:

1. An information processing method of a mobile terminal, comprising:
displaying a plurality of virtual key buttons on a touch screen including one or more touch input nodes generating a touch signal corresponding to a touch;
receiving a touch signal corresponding to the plurality of virtual key buttons displayed on the touch screen; and
outputting a key value of at least one of the plurality of virtual key buttons corresponding to the received touch signal according to touch data calculated based on the received touch signal,
wherein the touch data is calculated by expanding the touch signal to at least one virtual touch input node in proximity to touch input nodes generating the touch signal from among the one or more touch input nodes, wherein the outputting comprises determining the key value among the virtual key buttons based on a predetermined priority, when at least part of a shape of a touch region formed according to the touch data overlaps with at least two of the virtual key buttons, and wherein the priority is determined such that a virtual key button having a larger area overlapping pin with the shape of the touch region from among the plurality of virtual key buttons is given a first higher priority, a virtual key button located at an upper part from among the plurality of virtual key buttons is given a second higher priority, a center virtual key button from among the plurality of virtual key buttons is given a third higher priority, a virtual key button outputting a key value, which is input following a previously input key value to accomplish a meaningful word or sentence, is given a fourth higher priority, or a fifth priority corresponding to a combination of at least two of the first to fourth higher priorities is used.

2. The information processing method of claim 1, wherein the virtual touch input node corresponds to at least one virtual point located between the touch input nodes generating the touch signal and another touch input node in proximity to the touch input nodes generating the touch signal.

3. The information processing method of claim 1, wherein the touch data comprises an attenuation value of the touch based on a distance between the touch input nodes and the virtual touch input node.

4. The information processing method of claim 1, wherein the shape of the touch region corresponds to a closed surface including at least one of the touch input nodes generating the touch signal.

5. The information processing method of claim 1, wherein the priority is applied such that a virtual key button having a larger area overlapping with the shape of the touch region from among the plurality of virtual key buttons is given a higher priority.

6. The information processing method of claim 1, wherein the priority is applied such that a virtual key button located at an upper part from among the plurality of virtual key buttons is given a higher priority.

7. The information processing method of claim 1, wherein the priority is applied such that a center virtual key button from among the plurality of virtual key buttons is given a higher priority.

8. The information processing method of claim 1, wherein the priority is applied such that a virtual key button outputting a key value, which is input following a previously input key value to accomplish a meaningful word or sentence, is given a higher priority.

9. The information processing method of claim 1, further comprising setting the priority.

10. The information processing method of claim 1, wherein the displaying of the plurality of virtual key buttons comprises displaying the plurality of virtual key buttons such that at least one of an area, height, and width of at least one of the plurality of virtual key buttons is different from at least one of an area, height, and width of another virtual key button.

11. An information processing method of a mobile terminal, comprising:
displaying a plurality of virtual key buttons on a touch screen including one or more touch input nodes generating a touch signal corresponding to a touch;
receiving a touch signal corresponding to the plurality of virtual key buttons displayed on the touch screen; and
outputting a key value of a virtual key button at least part of which overlaps with a shape of a touch region formed according to touch data calculated on the basis of the received touch signal, as a key value corresponding to the touch, wherein the output key value is determined on the basis of a predetermined priority, wherein the touch data is calculated by expanding the touch signal to a virtual touch input node in proximity to touch input nodes generating the touch signal from among the one or more touch input nodes, wherein the outputting comprises determining the key value among the virtual key buttons based on a predetermined priority, when at least part of a shape of a touch region formed according to the touch data overlaps with at least two of the virtual key buttons, and wherein the priority is determined such that a virtual key button having a larger area overlapping with the shape of the touch region from among the plurality of virtual key buttons is given a first higher priority, a virtual key button located at an upper part from among the plurality of virtual key buttons is given a second higher priority, a center virtual key button from among the plurality of virtual key buttons is given a third higher priority, a virtual key button outputting a key value, which is input following a previously input key value to accomplish a meaningful word or sentence, is given a fourth higher priority, or a fifth priority corresponding to a combination of at least two of the first to fourth higher priorities is used.

12. The information processing method of claim 11, wherein the virtual touch input node corresponds to at least one virtual point located between the touch input nodes generating the touch signal and another touch input node in proximity to the touch input nodes generating the touch signal.

13. The information processing method of claim 12, wherein the touch data comprises an attenuation value of the touch based on a distance between the touch input nodes and the virtual touch input node.

14. The information processing method of claim 11, wherein the displaying of the plurality of virtual key buttons comprises displaying the plurality of virtual key buttons such that at least one of an area, height and width of at least one of the plurality of virtual key buttons is different from at least one of an area, height and width of another virtual key button.

15. A mobile terminal comprising:
a touch screen configured to include one or more touch input nodes generating a touch signal corresponding to a touch; and
a controller configured to receive a touch signal corresponding to one or more virtual key buttons from among a plurality of virtual key buttons displayed on the touch screen and to output a key value of at least one of the plurality of virtual key buttons as a key value corresponding to the received touch signal according to touch data calculated on the basis of the received touch signal, wherein the controller calculates the touch data by expanding the touch signal to a virtual touch input node in proximity to touch input nodes generating the touch signal from among the one or more touch input nodes, wherein the controller determines the key value among the virtual key buttons based on a predetermined priority, when at least part of a shape of a touch region formed according to the touch data overlaps with at least two of the virtual key buttons, and wherein the priority is determined such that a virtual key button having a larger area overlapping with the shape of the touch region from among the plurality of virtual key buttons is given a first higher priority, a virtual key button located at an upper part from among the plurality of virtual key buttons is given a second higher priority, a center virtual key button from among the plurality of virtual key buttons is given a third higher priority, a virtual key button outputting a key value, which is input following a previously input key value to accomplish a meaningful word or sentence, is given a fourth higher priority, or a fifth priority corresponding to a combination of at least two of the first to fourth higher priorities is used.

16. The mobile terminal of claim 15, wherein the controller sets at least one virtual point located between the touch input nodes generating the touch signal and another touch input node in proximity to the touch input nodes generating the touch signal as the virtual touch input node.

17. The mobile terminal of claim 15, wherein the touch data comprises an attenuation value of the touch based on a distance between the touch input nodes and the virtual touch input node.

* * * * *